W. THROENER.
POTATO PLANTER.
APPLICATION FILED APR. 6, 1909.
927,192.
Patented July 6, 1909.
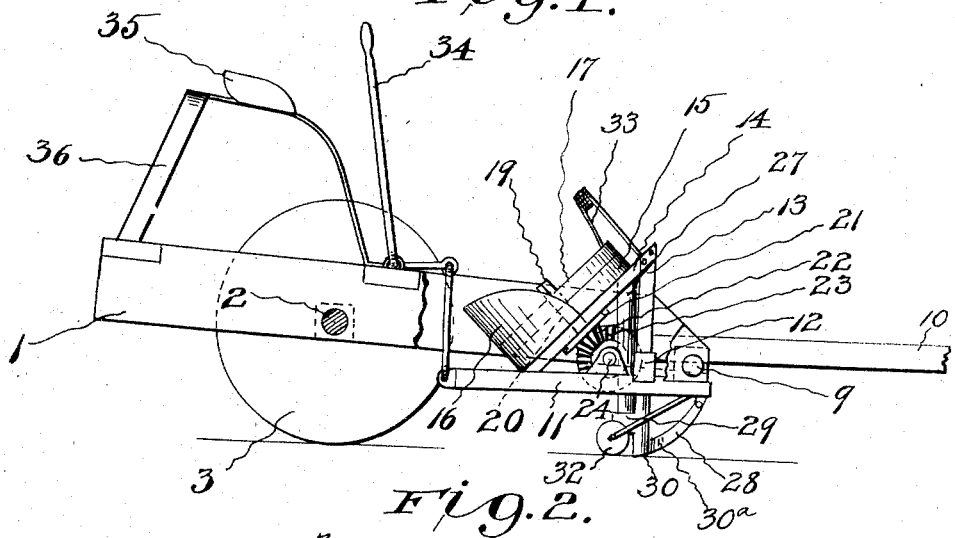
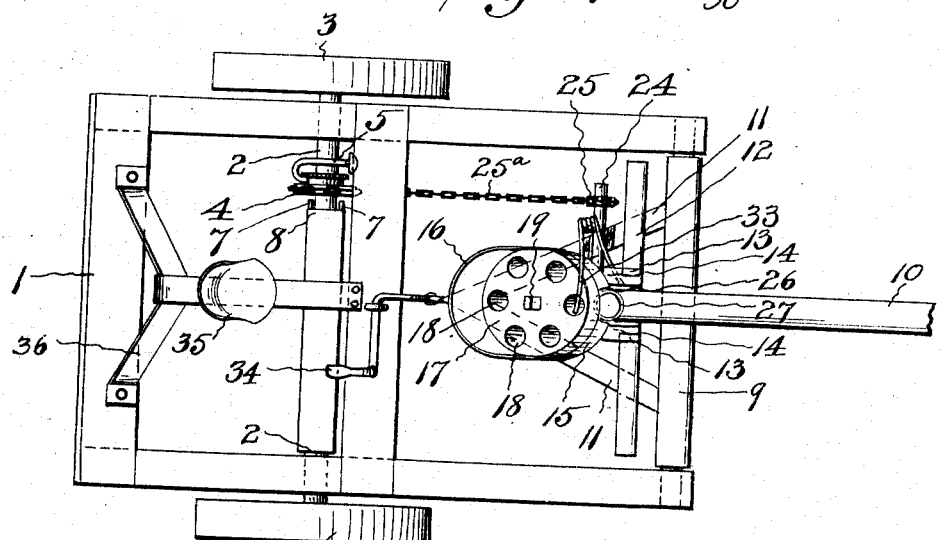
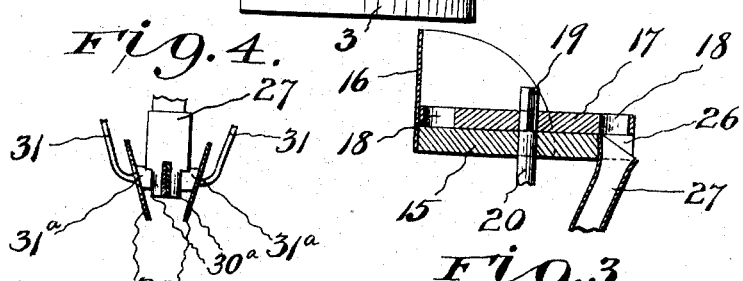
Witnesses
Jos. H. Blackwood
W. C. Blackwood
Inventor:
William Throener
By James K. Polk
Attorney

UNITED STATES PATENT OFFICE.

WILLIAM THROENER, OF WESTPOINT, NEBRASKA.

POTATO-PLANTER.

No. 927,192.  Specification of Letters Patent.  Patented July 6, 1909.

Application filed April 6, 1909. Serial No. 488,247.

*To all whom it may concern:*

Be it known that I, WILLIAM THROENER, a citizen of the United States, and a resident of Westpoint, in the county of Cuming and State of Nebraska, have invented certain new and useful Improvements in Potato-Planters, of which the following is a full and complete specification.

My invention relates to potato-planters of the revoluble disk feed class, and has for its object the provision of a machine reasonable in cost of manufacture, consisting of only a few parts, and consequently easily kept in repair, and simple in operation.

The construction and operation of my machine will be described in detail hereinafter and illustrated in the accompanying drawings, in which—

Figure 1 is a side view of my improved machine, with the frame partly broken away; Fig. 2, a top plan view; Fig. 3, a sectional view of the dropping mechanism; Fig. 4, a fragmental view, partly in section, of the front shoe or furrow-opener; and Fig. 5, a detail view of the driving sprocket, showing the driving-shaft in section.

In the drawings similar reference characters indicate corresponding parts throughout the several views.

The frame 1 of my improved machine has the axle 2 journaled thereon, with the traction-wheels secured thereto.

4 indicates a sprocket-wheel loosely mounted on the shaft or axle 2 and slidably mounted by means of a lever 5, fulcrumed on the frame 1, said sprocket-wheel being provided with notches 6 that engage pins 7, projecting from shoulder 8 on the shaft that operates as a clutch to secure the sprocket-wheel for rotation with shaft 2.

9 indicates a rock-shaft journaled in the front of frame 1, to which is secured the draft-beam 10, and a rearwardly-extending triangular frame 11.

12 indicates a cross-bar secured near the front end of triangular frame 11, 13 are uprights secured to said cross-bar, and 14 are inclined bars secured to the upper ends of uprights 13 and two sides of triangular frame 11, adjacent to its rear end.

15 indicates a circular platform secured to bars 14, and 16 an upright plate secured around the lower and rear edge of the platform 15 and forming therewith a scoop-like receptacle.

17 indicates a disk mounted on platform 15 and provided with a series of holes 18, the center of the disk being secured to the upper rectangular portion 19 of the shaft 20, journaled in platform 15, and cross-bar 21, secured to the inclined bars 14.

22 indicates a beveled pinion keyed to the lower end of shaft 20 that meshes with the beveled pinion 23 on shaft 24, journaled on triangular frame 11, and 25 a sprocket-wheel keyed to shaft 24 and geared to sprocket-wheel 4 by means of chain 25.

26 indicates a notch in the front and upper end of platform 15, and 27 a dropper-tube secured in said notch and having its lower end secured to shoe or furrow opener 28 by means of a tubular extension 29, inclosing its lower end. Shoe 28 has a narrow cutting edge 30 and spread laterally just in front of the mouth of tube 27 to form wings 30ª, to make furrows to receive the seed potatoes dropped through the tube.

31 indicates a frame secured to rock-shaft 9 and the rear side of tube 27, and having disks 32 set at an angle thereon to throw earth on the potatoes after being dropped from the tube.

33 indicates a spring-finger secured to one of the uprights 13 and engaging the holes 18 in turn when they are in alinement with notch 26 and serves not only to stop the rotation of disk 17 momentarily, but also to push the seed potatoes out of the hole into the dropper tube 27.

34 indicates a lever fulcrumed on frame 1 to raise and lower the triangular frame, as desired by the operator seated on the seat 35, secured to support 36, the frame being lowered when the machine is in operation and raised when going to and from the field and also in turning after planting a row.

In operation the seed potatoes are placed in the scoop-like receptacle formed by the platform 15 and plate 16 and on top of disk 17. The triangular frame 11 is then lowered and the sprocket-wheel 4 is moved into engagement with pin 7 on axle 2. When the machine is drawn forward, it will be understood that the disk 17 rotates, carrying in the holes 18 a seed potato, the holes being just large enough to receive a single potato seed and the inclined position of the disk insuring that all the seed but those caught in the holes will stay in the lower end of the receptacle. When one of the holes 18 registers with the notch 26 in the platform the spring-finger 33 enters it and pushes the seed out of the hole into the tube 27, through which it falls into the furrow formed by wings 30ª of shoe 28, and it is immediately covered by the disks 32.

Having thus described my invention, what I claim is—

A potato-planter comprising a frame, an axle journaled on the frame and having the traction-wheels secured thereto, a sprocket-wheel slidably mounted on the axle, a clutch to engage said sprocket-wheel, a rock-shaft journaled on the front of the frame, a triangular frame secured to said rock-shaft, a shaft journaled on said triangular frame, a sprocket-wheel secured to said shaft and geared to the first-mentioned sprocket-wheel, a beveled pinion secured to said shaft, an inclined platform mounted on said triangular frame, a shaft journaled in said platform and having a beveled pinion thereon geared to the first-mentioned beveled pinion, a perforated disk secured to the last-mentioned shaft and rotatably mounted on the platform, a plate secured to the lower end of the platform, the upper end of the platform formed with a notch, a dropper-tube secured to said notch, a shoe secured to the rock-shaft and engaging the lower end of the dropper-tube, said shoe provided with wings in advance of the delivery-end of the tube, disks secured behind the tube, a spring-finger supported adjacent to the platform and having its free end engaging the disk above the receiving end of the tube, and a lever fulcrumed on the first mentioned frame and secured to the free end of the triangular frame, substantially as shown and described.

In witness whereof, I have hereunto set my hand in presence of two subscribing witnesses.

WILLIAM THROENER.

Witnesses:
C. RUPP,
F. D. HUNKER.